United States Patent
Vaidyanath et al.

(10) Patent No.: US 11,637,839 B2
(45) Date of Patent: Apr. 25, 2023

(54) AUTOMATED AND ADAPTIVE VALIDATION OF A USER INTERFACE

(71) Applicant: Bank of America Corporation, Charlotte, NC (US)

(72) Inventors: Madhav Vaidyanath, Tamil Nadu (IN); Vinod Anbalagan, Tamil Nadu (IN); Thilagaraj Kannaiyan, Tamil Nadu (IN); Varshini Ramiya Vasudevan, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 213 days.

(21) Appl. No.: 16/898,648

(22) Filed: Jun. 11, 2020

(65) Prior Publication Data

US 2021/0392144 A1 Dec. 16, 2021

(51) Int. Cl.
*H04L 9/40* (2022.01)
*G06F 11/36* (2006.01)
*G06F 16/28* (2019.01)

(52) U.S. Cl.
CPC ........ *H04L 63/123* (2013.01); *G06F 11/3608* (2013.01); *G06F 16/285* (2019.01)

(58) Field of Classification Search
CPC .............................. H04L 63/123; G06F 16/285
See application file for complete search history.

(56) References Cited

U.S. PATENT DOCUMENTS

| | | | |
|---|---|---|---|
| 7,757,175 B2 | 7/2010 | Miller | |
| 8,117,203 B2 | 2/2012 | Gazen et al. | |
| 8,458,604 B2 | 6/2013 | Lodico et al. | |
| 10,474,457 B1* | 11/2019 | Pham | G06N 20/00 |
| 2009/0125529 A1* | 5/2009 | Vydiswaran | G06F 16/951 |
| 2014/0082482 A1 | 3/2014 | Seolas et al. | |
| 2018/0011780 A1 | 1/2018 | Aggarwal et al. | |
| 2018/0067845 A1* | 3/2018 | Costello, Jr. | G06F 11/3688 |
| 2020/0036621 A1* | 1/2020 | Veeraraghavan | G06F 11/3414 |

* cited by examiner

*Primary Examiner* — Esther B. Henderson
(74) *Attorney, Agent, or Firm* — Banner & Witcoff, Ltd.

(57) ABSTRACT

Aspects of the disclosure relate to an automated and adaptive validation of a user interface. A computing platform may extract, from a webpage, one or more components of the webpage. Subsequently, the computing platform may determine, for a component, one or more attributes and one or more rules. Then, the computing platform may associate, by applying a clustering algorithm and based on the one or more attributes and the one or more rules, the component with a cluster of a plurality of clusters. Then, the computing platform may retrieve, from a database and for the cluster, a master test script. Subsequently, the computing platform may generate, from the master script, a test script for execution, and may run, for the webpage, the test script to validate the component. Subsequently, the computing platform may trigger one or more recommendations based on a determination whether the test script is successful.

18 Claims, 9 Drawing Sheets

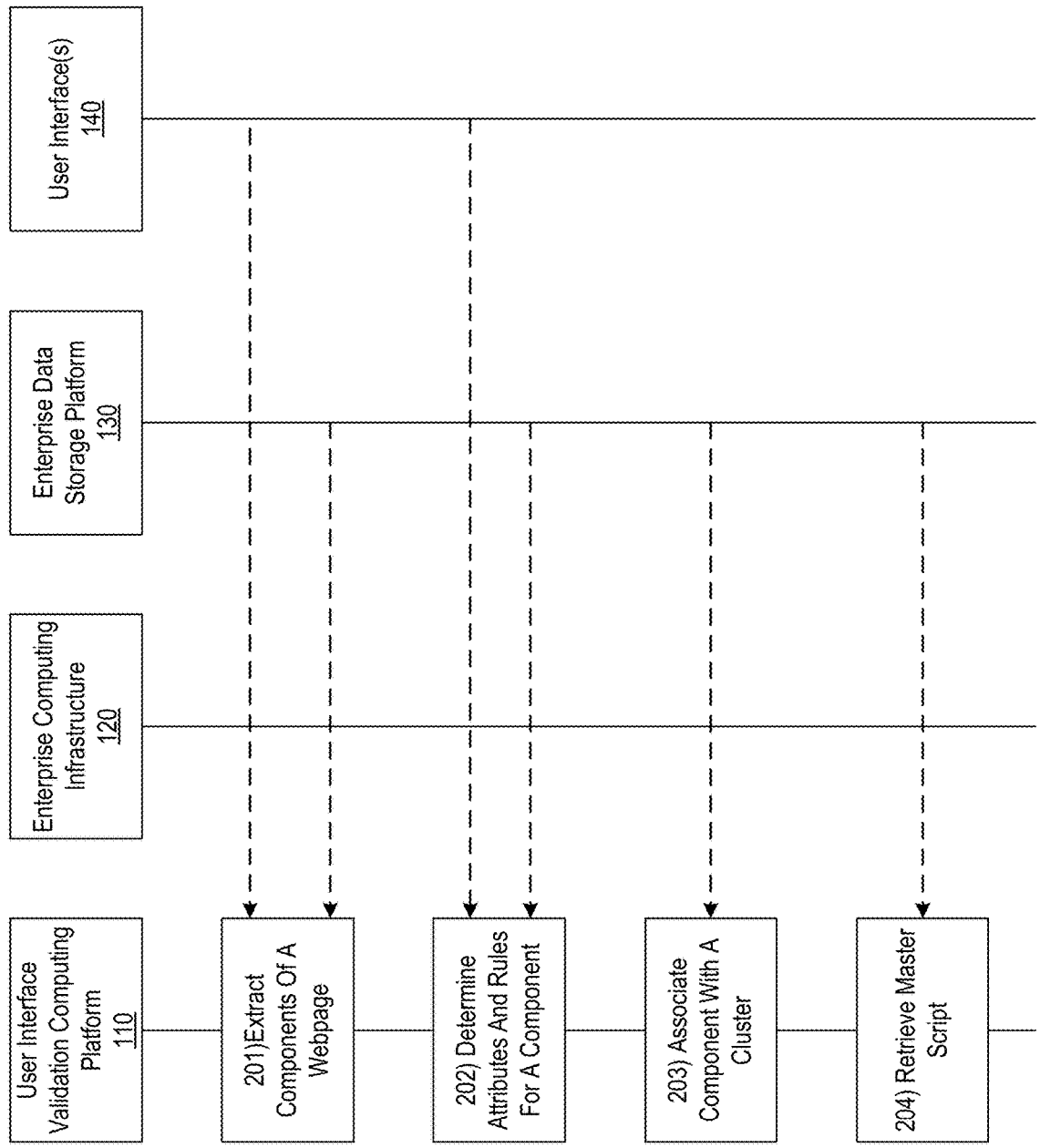

AUTOMATED AND ADAPTIVE VALIDATION OF A USER INTERFACE

BACKGROUND

Aspects of the disclosure relate to deploying digital data processing systems to validate a webpage. In particular, one or more aspects of the disclosure relate to an automated and adaptive validation of a user interface.

Enterprise organizations may utilize various computing infrastructure to transact business with their users. Such activities may include various webpages that are created and/or used for various purposes. One or more attributes of a webpage may change over time. For example, a content of the webpage may change, a functionality of the webpage may change, a uniform resource locator for the webpage may change, and so forth. Such changes may occur due to one or more factors, such as, for example, a change to a business need, a technology simplification, a performance based modification, and so forth. In order to ensure that the webpages are functioning as expected, enterprise organizations may utilize various resources to validate the webpages. Such validation may be time-sensitive and may need to be performed in real-time. Ensuring that webpages are validated in a timely manner, and such validation is performed seamlessly, may be highly advantageous to providing an efficient and effective platform to the users to transact business. In many instances, however, it may be difficult to ensure validation of the webpages while also attempting to optimize the resource utilization, bandwidth utilization, and efficient operations of the computing infrastructure involved in maintaining, accessing, and executing the webpage.

SUMMARY

Aspects of the disclosure provide effective, efficient, scalable, fast, reliable, and convenient technical solutions that address and overcome the technical problems associated with an automated and adaptive validation of a user interface.

In accordance with one or more embodiments, a computing platform having at least one processor, and memory storing computer-readable instructions that, when executed by the at least one processor, cause the computing platform to extract, from a webpage, one or more components of the webpage. Subsequently, the computing platform may determine, for a component of the one or more components, one or more attributes and one or more rules. Then, the computing platform may associate, by applying a clustering algorithm and based on the one or more attributes and the one or more rules, the component with a cluster of a plurality of clusters. Then, the computing platform may retrieve, from a database and for the cluster of the plurality of clusters, a master test script. Subsequently, the computing platform may generate, from the master script and based on the one or more attributes and the one or more rules, a test script for execution. Then, the computing platform may run, for the webpage, the test script to validate the component. Subsequently, the computing platform may trigger, based on a determination whether the test script is successful, one or more recommendations associated with the component of the webpage.

In some embodiments, the computing platform may trigger the one or more recommendations by determining, based on a determination that the test script has failed and based on a virtual assistant, a cause for the test script to have failed. Then, the computing platform may update, based on the cause, the test script. Subsequently, the computing platform may run, for the webpage, the updated test script to validate the component.

In some embodiments, the computing platform may perform a second extraction of the webpage. Then, the computing platform may determine, for the component and based on the second extraction, one or more second attributes and one or more second rules. Subsequently, the computing platform may identify, based on a comparison of the one or more second attributes with the one or more attributes, and of the one or more second rules with the one or more rules, a change to the component, where the updating the test script is based on the identified change.

In some embodiments, the determination whether the test script is successful may include a determination that the test script is successful, and the computing platform may generate, based on a determination that the test script is successful, a report indicating that the test script is successful. Then, the computing platform may store, in the database, the test script. In some embodiments, the computing platform may provide, via a graphical user interface, the report.

In some embodiments, the computing platform may generate, from the webpage and for the component, a reference comprising a unique identifier associated with the component, and where the associating the component with the cluster is based on the reference.

In some embodiments, the computing platform may train a machine learning model to determine the plurality of clusters.

In some embodiments, the computing platform may generate the test script by generating, based on a functionality of the component, test data to validate the functionality.

In some embodiments, the computing platform may generate the test script by generating the test script based on one or more properties of the webpage.

In some embodiments, the component may include one of: an object of the webpage, a property of the webpage, a name associated with the webpage, an action performed by the webpage, a tag associated with the webpage, a title of the webpage, a uniform resource locator for the webpage, and content of the webpage.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A and 2B depict an illustrative event sequence for an automated and adaptive validation of a user interface;

DETAILED DESCRIPTION

Figure 1A:
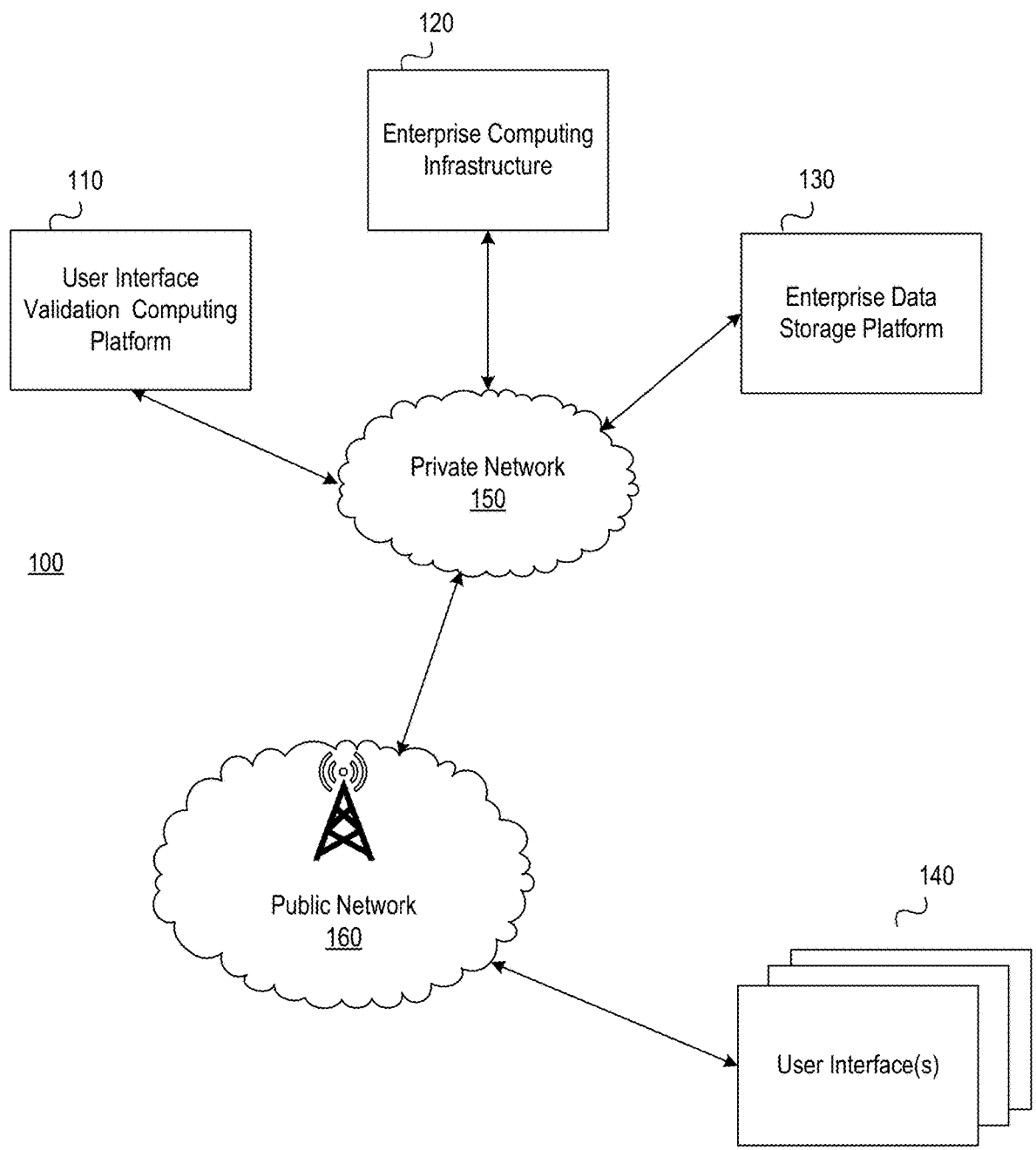
FIGS. 1A and 1B depict an illustrative computing environment for an automated and adaptive validation of a user interface.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Organizations across industrial sectors, such as finance, pharmaceuticals, manufacturing, retail, education, and so forth, generally host web applications associated with the organization to provide various goods and/or services to users. Such web applications may provide various functionalities that are of high significance to the organization. For example, an online platform may provide various text (e.g., stock prices), images (e.g., graphical representations of financial data), login functionality, payment functionality, functionality for various transactions, and so forth. Some of this information and data may need to be received and/or provided in a secure manner, and the web platform may also need to be secured. As another example, an online retailer may need to provide goods and/or services via a webpage. Aspects of the webpage may provide graphical displays of the goods, description of the goods, payment and price information, a payment interface, a login interface, and so forth. Also, for example, a platform for real estate may provide a web resource with a listing of real estate, various ways to filter data, images of properties listed, pricing information, mortgage information, a mortgage calculator, and so forth. In many instances, confidential and secure information exchanged via such webpages may be vulnerable to unauthorized access and/or misappropriation. Also, for example, maintaining and providing functionalities of a user interface may be of significant importance for the organization.

A large volume of transactions are now performed online. User interfaces that facilitate such online transactions may be subject to constant changes, updates, modifications, runtime errors, and so forth. For example, there may be frequent changes in webpage objects, webpage properties, webpage functionality, and/or webpage content. Also, for example, there may be failed scripts during unmanned test execution. Such changes may be a result of changes to business requirements, simplifications to technology, or other changes impacting performance of the webpage. Accordingly, user interfaces need to be tested extensively so that the user interface may continue to provide the goods and services with a minimal impact to the organization, and with a minimal impact to users of the user interface. Time consuming, manual validation and fixing of automation scripts may not be efficient or reliable due to a lack of intuitive self-recovery options. Generally, automated testing of such web applications using traditional code driven tools, such as, for example, selenium, and/or licensed tools, may not be able to adapt to changes in business priorities and/or technical implementations, thereby resulting in longer test cycles, voluminous automation suites, repeated interruptions of automated suite execution, and/or longer debugging time. Accordingly, it may be of significant importance for an enterprise organization to devise ways in which to validate the user interfaces in real-time, so as to identify runtime errors and provide remediation with speed and accuracy.

Some aspects of the disclosure relate to creating an intelligent virtual assistant to address the aspects described herein. In particular, as described herein, a webpage may be analyzed to extract web elements, and the elements may be clustered. A rules engine may be configured to identify webpage type, and possible functionality to be validated using clustered data. Based on an output of the rules engine, a test script may be automatically generated utilizing the web page properties and its possible/expected behavior. The test script may be run to validate elements of a webpage, and recovery options may be automatically determined to prevent script failure. Fast information processing, fast data transmission rates, availability of bandwidth, and so forth may be significant factors in configuring and/or managing the intelligent virtual assistant.

Figure 1B:
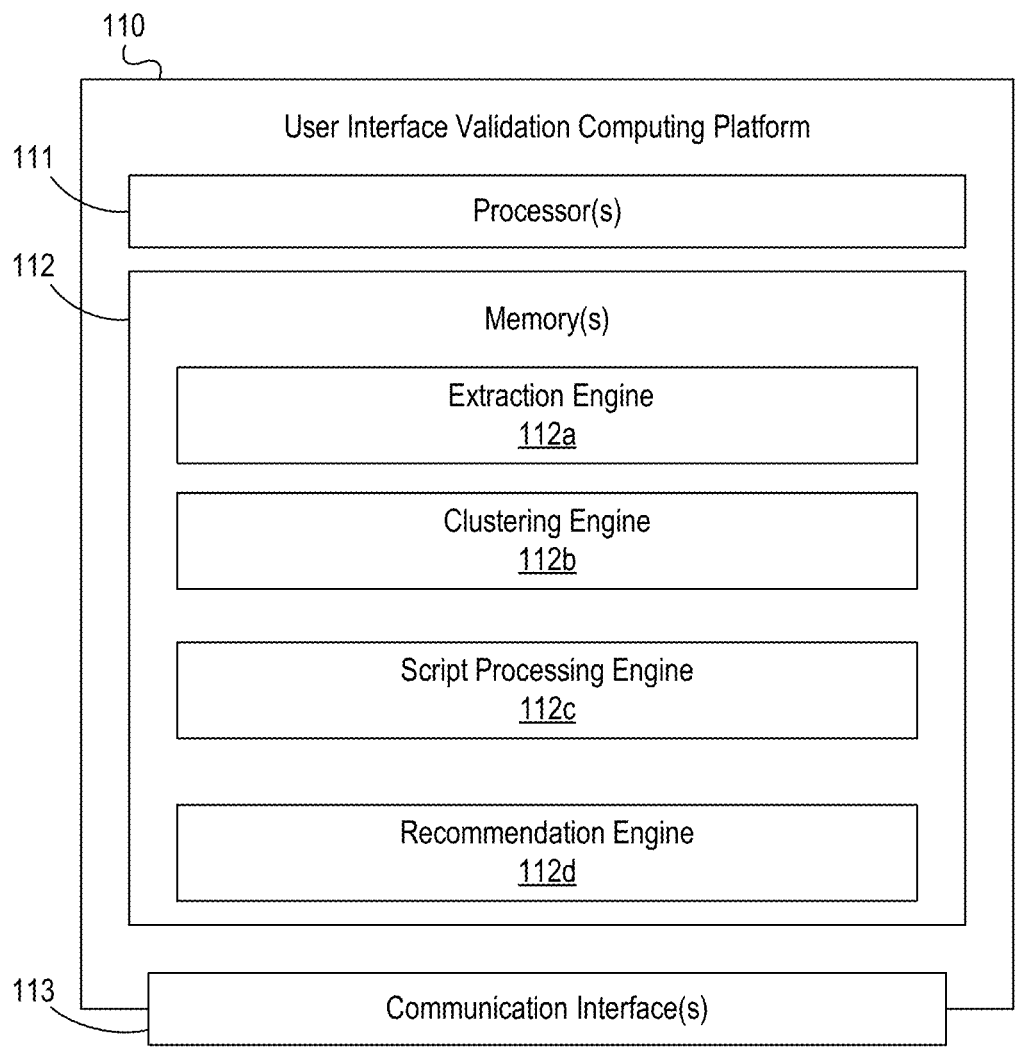

FIGS. 1A and 1B depict an illustrative computing environment for an automated and adaptive validation of a user interface. Referring to FIG. 1A, computing environment 100 may include one or more computer systems. For example, computing environment 100 may include a user interface validation computing platform 140, enterprise computing infrastructure 120, an enterprise data storage platform 130, and a user interface 140, communicatively coupled to a sensor 140A.

As illustrated in greater detail below, user interface validation computing platform 110 may include one or more computing devices configured to perform one or more of the functions described herein. For example, user interface validation computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more user interfaces 140. For example, enterprise computing infrastructure 120 may be configured to host, execute, and/or otherwise provide one or more transaction processing programs, an enterprise mobile application for user devices, encryption and decryption algorithms, hash functions, a trading platform, a mortgage calculator, a payment interface, a banking platform, and/or other programs associated with an enterprise server. In some instances, enterprise computing infrastructure 120 may be configured to provide various enterprise and/or back-office computing functions for an enterprise organization, such as a banking institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute recommendations on specific accounts based on scripts, commands and/or other information received from other computer systems included in computing environment 100. Additionally or alternatively, enterprise computing infrastructure 120 may receive instructions from user interface validation computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, clusters, object, references, business rules, test scenarios, scripts, script validation logs, reports, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

User interface 140 may be a web resource on a personal computing device (e.g., desktop computer, laptop computer) or mobile computing device (e.g., smartphone, tablet, wearable device). In addition, user interface 140 may be linked to and/or used by a specific user (who may, e.g., be a customer of a financial institution or other organization operating user interface validation computing platform 140). Also, for example, user of user interface 140 may utilize user interface 140 to perform transactions (e.g., perform banking operations, perform financial transactions, trade financial assets, calculate mortgage payments, calculate loan payments, and so forth).

Computing environment 100 also may include one or more networks, which may interconnect one or more of user interface validation computing platform 140, enterprise computing infrastructure 120, enterprise data storage platform 130, and user interface 140. For example, computing environment 100 may include a private network 150 (which may, e.g., interconnect user interface validation computing platform 140, enterprise computing infrastructure 120, enterprise data storage platform 130, and/or one or more other systems which may be associated with an organization, such as a financial institution) and public network 160 (which may, e.g., interconnect user interface 140 with private network 150 and/or one or more other systems, public networks, sub-networks, and/or the like). Public network 160 may be a high generation cellular network, such as, for example, a 5G or higher cellular network. In some embodiments, private network 150 may likewise be a high generation cellular enterprise network, such as, for example, a 5G or higher cellular network. In some embodiments, computing environment 100 also may include a local network (which may, e.g., interconnect user interface 140 and one or more other devices with each other).

In one or more arrangements, enterprise computing infrastructure 120, enterprise data storage platform 130, and user interface 140, and/or the other systems included in computing environment 100 may be any type of computing device capable of receiving input via a user interface, and communicating the received input to one or more other computing devices. For example, enterprise computing infrastructure 120, enterprise data storage platform 130, and user interface 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user interface validation computing platform 140, enterprise computing infrastructure 120, enterprise data storage platform 130, and user interface 140, may, in some instances, be special-purpose computing devices configured to perform specific functions.

Referring to FIG. 1B, user interface validation computing platform 110 may include one or more processors 111, memory 112, and communication interface 113. A data bus may interconnect processor 111, memory 112, and communication interface 113. Communication interface 113 may be a network interface configured to support communication between user interface validation computing platform 110 and one or more networks (e.g., network 150, network 160, a local network, or the like). Memory 112 may include one or more program modules having instructions that when executed by processor 111 cause user interface validation computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of user interface validation computing platform 110 and/or by different computing devices that may form and/or otherwise make up user interface validation computing platform 140. For example, memory 112 may have, store, and/or include an extraction engine 112a, a clustering engine 112b, a script processing engine 112c, and a recommendation engine 112d. Extraction engine 112a may have instructions that direct and/or cause user interface validation computing platform 110 to ensure functionality of a user interface that may interact with customers of the enterprise computing infrastructure 120, as discussed in greater detail below. In some embodiments, extraction engine 112a may have instructions that direct and/or cause user interface validation computing platform 110 to extract, from a webpage, one or more components of the webpage. In some embodiments, extraction engine 112a may have instructions that direct and/or cause user interface validation computing platform 110 to determine, for a component of the one or more components, one or more attributes and one or more rules. Clustering engine 112b may have instructions that direct and/or cause user interface validation computing platform 110 to associate, by applying a clustering algorithm and based on the one or more attributes and the one or more rules, the component with a cluster of a plurality of clusters. Script processing engine 112c may have instructions that direct and/or cause user interface validation computing platform 110 to retrieve, from a database (e.g., enterprise data storage platform 130) and for the cluster of the plurality of clusters, a master test script. In some embodiments, script processing engine 112c may have instructions that direct and/or cause user interface validation computing platform 110 to generate, from the master script and based on the one or more attributes and the one or more rules, a test script for execution. Also, for example, script processing engine 112c may have instructions that direct and/or cause user interface validation computing platform 110 to run, for the webpage, the test script to validate the component. Recommendation engine 112d may have instructions that direct and/or cause user interface validation computing platform 110 to trigger, based on a determination whether the test script is successful, one or more recommendations associated with the component of the webpage.

Figure 2B:
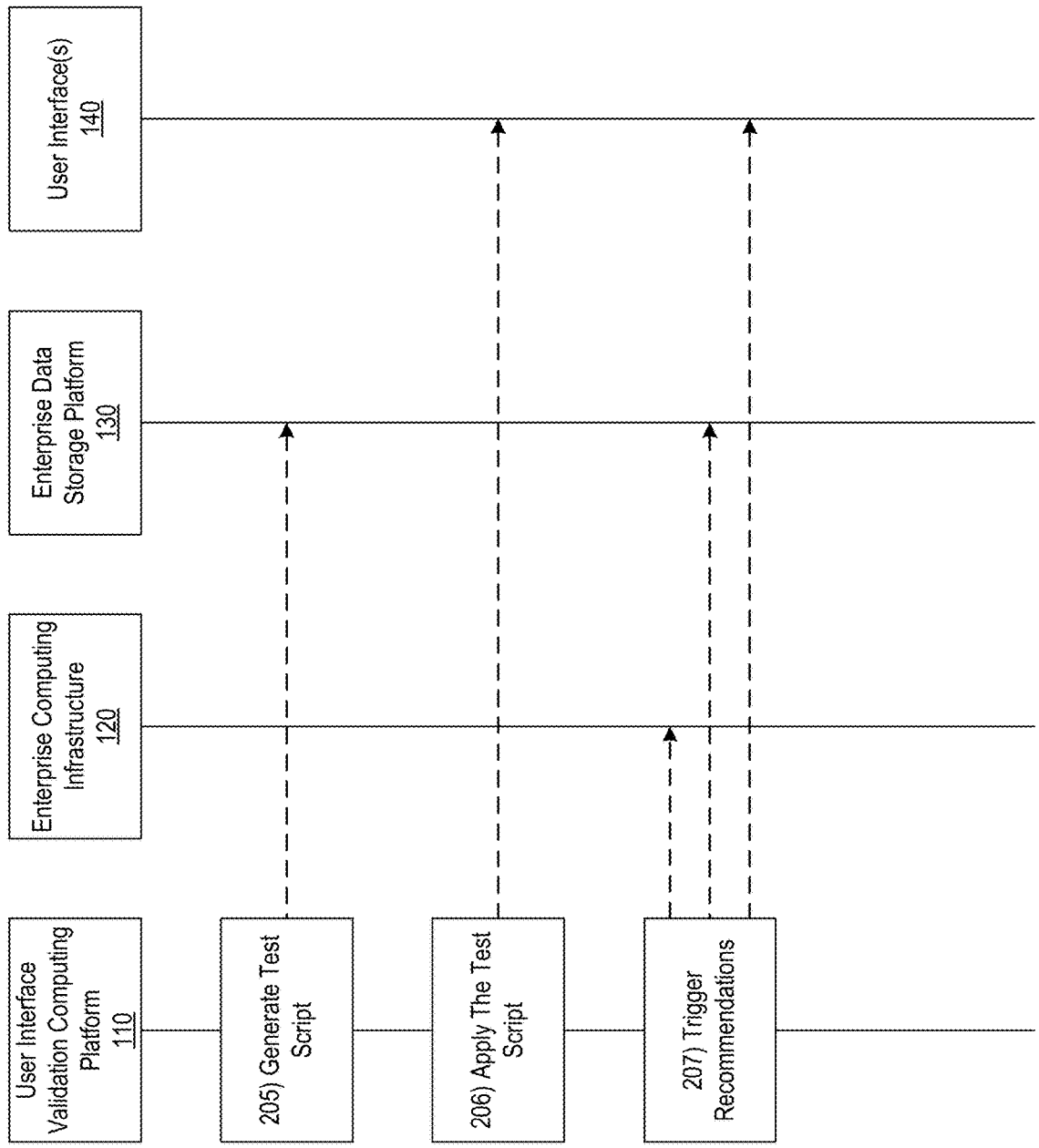

FIGS. 2A and 2B depict an illustrative event sequence for an automated and adaptive validation of a user interface. Referring to FIG. 2A, at step 201, user interface validation computing platform 110 may extract, from a webpage, one or more components of the webpage. Generally, a user interface or a webpage comprises components or elements that provide enable the webpage to provide its functionality. For example, a webpage may include textual content, audio content, video content, embedded images, white space, links to other webpages, and so forth. In some implementations, the webpage may include script (e.g., JavaScript code) to enable dynamic behavior. As another example, a webpage may include a layout, a format, specific types of fonts, various font sizes, color schemes, and so forth. Also, for example, a webpage may provide various tools to provide functionality.

Several of these components may be related to one another, and/or inter-dependent. Generally, for a webpage to function as designed, an error in one such component may cause an error in one or more other components. For example, if a font size of a first section of text is mistakenly larger than it is intended, then the first section of text may overlap another section of text on the webpage, thereby causing it to be unreadable. As another example, a webpage may provide audiovisual content, and an error in the audio file may reduce utility of the video portion.

Various tools may be utilized to perform extraction of components of the webpage. For example, a webpage may be generally designed with one or more programming languages, such as HyperText Markup Language (HTML), Cascading Style Sheets (CSS), JavaScript, Python, Bootstrap, Structured Query Language (SQL), Hypertext Preprocessor (PHP, and so forth. In some embodiments, user interface validation computing platform 110 may be configured to identify a programming language, and identify components of the webpage based on commands utilized in the programming language.

Also, for example, data extraction techniques may be utilized to extract components of a webpage. For example, Python may be utilized to extract components of the webpage. Also, for example, open source programming languages such as, for example, Ruby, may support parsers such as XPath, and CSS selector. For example, a data extraction tool may be provided an URL to load, and the HTML code for the webpage associated with the URL may be loaded, including, for example, CSS and JavaScript elements.

For example, a webpage may be associated with a uniform resource locator (URL) that serves as a reference to the webpage, and indicates a location. For example, "www-.name.domain," may indicate a host name for a webpage, including a name, and a domain where it may be located. For example, a domain may be a ".com", ".net", ".edu", and so forth. Also, for example, "http://www.name.domain/index-.pdf" may indicate a protocol, "http," a host name, "www-.name.domain," and a file name "index.pdf." As another example, the URL may be associated with a syntax. Appropriate syntax may play a significant role in a proper functioning of the URL. For example, a syntax of the URL may include a scheme component (e.g., http, https, ftp, and so forth), followed by a colon (:), and a path component. In some embodiments, the syntax may comprise additional elements, such as, for example, slashes (//), a user name and/or password, a host, a port, and so forth. Accordingly, interface validation computing platform 110 may load the HTML code associated with the URL, along with the syntax of the URL.

In some embodiments, the one or more components may include one of: an object of the webpage, a property of the webpage, an action performed by the webpage, a tag associated with the webpage, a title of the webpage, and content of the webpage. For example, the object of the webpage may include one or more of characters used in the webpage, images, links, lists, tables, paragraphs, lines, and so forth. An object may comprise further features, such, as, for example, font, color, size, location, and so forth.

The functionality of a webpage may include one or more actions a user may perform on the webpage, collection and/or extraction of web data for a host of the webpage, interactivity, and/or dynamic content. For example, the webpage may provide a form that a user may fill out. Accordingly, the form may comprise text fields for the user to enter text, and/or an ability to attach a file. Also, for example, the functionality of the webpage may include a call to action that prompts the user to take action. For example, a webpage may invite a user to subscribe to the website, donate to a charity, view a video, click on a survey, respond to a question, and so forth.

A web tag associated with the webpage may be a tool to gather user information. For example, organizations may, upon user authorization, collect user data indicating user behavior at a website. For example, an online retailer may collect data indicating a user's purchase behavior. Also, for example, a provider of educational content may collect data indicative of a user's interaction with the content. The tag may be a Java code, a small pixel, or a transparent image that may facilitate collection of unique information associated with on-site behavior.

A title of the webpage may be a short description of the contents of the webpage. For example, the title may be "Automated and adaptive validation of a user interface." Generally, in HTML, the title may be provided in a <title> tag, as part of a <head> tag. For example, a <title> tag may be: "<title> Automated and adaptive validation of a user interface </title>." Accordingly, interface validation computing platform 110 may load the HTML code associated with a URL, and extract the title from the title tag.

Content of the webpage may generally refer to content that may be provided to a user as part of a user's web experience at a website. For example, content may include textual content, visual content, audio content, white space, and so forth. For example, a website hosted by a news organization may include one or more selectable headlines, videos that may be viewed, navigational links, images, and so forth. As another example, a website hosted by a search engine provider may display a listing of search results, including for example, a title, a link, a short description, and so forth.

In some embodiments, at step 201, user interface validation computing platform 110 may retrieve, from a database and based on a request to validate a user interface, the one or more components associated with the user interface. In some embodiments, user interface validation computing platform 110 may extract components of a webpage, and store them in a repository (e.g., enterprise data storage platform 130). In some embodiments, user interface validation computing platform 110 may periodically extract and update the components. Accordingly, upon receiving a request to validate a user interface, user interface validation computing platform 110 may query the repository (e.g., enterprise data storage platform 130), and based on, for example, an indexing of the repository, retrieve the one or more components associated with the user interface. In some embodiments, user interface validation computing platform 110 may retrieve the one or more components, identify components that may be updated, extract the identified components from the webpage, and update the one or more components. In some embodiments, the request to validate the webpage may identify the one or more components that may need to be validated. Accordingly, user interface validation computing platform 110 may retrieve the identified one or more components from the repository (e.g., enterprise data storage platform 130).

At step 202, user interface validation computing platform 110 may determine, for a component of the one or more components, one or more attributes and one or more rules.

A component of a webpage may include one or more attributes. For example, an image component may include attributes such as a source of the image, a width, a height, a resolution, a file format, and so forth. As another example, textual content may include attributes such as a font type, a font size, font color, and so forth. As another example, a paragraph content may include an indentation, a line spacing, spacing before and after the paragraph, and so forth. As another example, the component may be a text box. In some embodiments, an attribute may be a limit on the number and/or type of characters that may be entered, a limit for a file size that may be uploaded, and/or a type of file or a number of files that may be uploaded.

In some embodiments, at step 202, user interface validation computing platform 110 may generate, from the webpage and for the component, a reference comprising a unique identifier associated with the component. For example, when a HTML content of a webpage is loaded, the one or more components may be associated with a reference. For example, a style of a webpage may be associated with a reference "<style>," relationships between the loaded document and an external web resource may be associated with a reference "<link>," machine readable information about the webpage, such as, for example, a style, a script, a style sheet, and so forth, may be associated with a reference "<head>." Also, for example, a portion of the webpage that provides navigational links within the webpage, or to resources external to the webpage, may be associated with a reference "<nav>." As another example, audio content in a webpage, including an audio source, a destination, and so forth, may be associated with a reference "<audio>." In some embodiments, the audio source may be associated with a reference "<src>." Additional, and/or alternative references may be associated with the one or more components and/or elements of a webpage.

At step 203, user interface validation computing platform 110 may associate, by applying a clustering algorithm and based on the one or more attributes, the component with a cluster of a plurality of clusters. Clustering may generally group components of a webpage based on common attributes, shared rules, common functionality, and so forth. Generally, clustering enables common test scripts to be generated, so that webpages, and/or components, may be tested efficiently. For example, user interface validation computing platform 110 may group the one or more components. For example, textual components may comprise a first cluster, audio components may comprise a second cluster, video components may comprise a third cluster, a title component may comprise a fourth cluster, and so forth. In some embodiments, a cluster may be further subdivided based on attributes. For example, a cluster corresponding to textual content may be further subdivided based on font size, font color, and so forth. Also, for example, a cluster corresponding to audio content may be further subdivided based on a source of the audio content.

The one or more rules may generally refer to rules that enable a layout of a webpage, a functionality of the webpage, interrelationships between the one or more components of the webpage, and so forth. For example, a website may provide a functionality comprising a calculator, and the one or more rules may be the logic that enables the calculator to function properly. As another example, the website may include one or more security features, and the one or more rules may be the logic underlying the security features. Also, for example, the website may provide login functionality, and the one or more rules may include logic that indicates a type of username, manages password requirements (e.g., length, special characters, upper case, lower case, and so forth), checks for an input such as a username and password, generates an error message, displays an error message, authenticates the password (e.g., initiate a 2-factor authentication), and so forth. In some embodiments, the one or more rules may be business rules of an organization. For example, the business rules may indicate a security profile for the organization. Accordingly, the business rules may be associated with compliance with regulatory agencies, features to protect, transmit, and/or process the information. As another example, an organization may not permit links to certain web resources external to the webpage. Accordingly, the business rules may indicate a type, and/or list of web resources to which a link may not be provided.

In some embodiments, at step 203, user interface validation computing platform 110 may associate, by applying a clustering algorithm and based on the one or more rules, the component with the cluster. For example, a cluster may comprise a type of username, password requirements, and so forth, for a login functionality. As another example, the one or more rules may be associated with a size, format, resolution, and so forth, for audiovisual content in the webpage, and user interface validation computing platform 110 may associate the cluster based on such characteristics.

In some embodiments, at step 203, user interface validation computing platform 110 may associate the component with the cluster based on the reference. For example, upon associating a component with a reference, user interface validation computing platform 110 may group components that share a reference. For example, components associated with the reference "<style>" may comprise a first cluster, components associated with the reference "<link>" may comprise a second cluster, components associated with the reference "<head>" may comprise a third cluster, components associated with the reference "<nav>" may comprise a fourth cluster, components associated with the reference "<audio>" may comprise a fifth cluster, and components associated with the reference "<src>" may comprise a sixth cluster, and so forth.

In some embodiments, at step 203, user interface validation computing platform 110 may train a machine learning model to determine the plurality of clusters. For example, the machine learning model may detect patterns among the one or more attributes, the one or more rules, the references, and so forth, and generate clusters based on the detected patterns. Also, for example, the machine learning model may detect patterns in interplays between the one or more attributes, the one or more rules, and/or the references.

In some embodiments, historical data based on previously generated clusters for the webpage may be available. In some embodiments, historical data based on previously generated clusters for a type of webpage may be available. Accordingly, the machine learning model may be trained via supervised learning techniques, based on labeled data (e.g., historical data), to learn to detect the patterns and generate the clusters. For example, user interface validation computing platform 110 may be configured to apply supervised learning techniques based on one or more of random forest, gradient boosted trees, support vector machines, neural networks, decision trees, and so forth. For example, a k-means clustering and/or a principal component analysis technique may be utilized. In some embodiments, such tools may be utilized to detect a new cluster.

In some embodiments, user interface validation computing platform 110 may associate, by applying the machine learning model, the component with the cluster. For example, based on learning to detect patterns in interplays between the one or more attributes, the one or more rules, and/or the references, the machine learning model may be applied to generate the clusters, and/or associate a component with a cluster.

At step 204, user interface validation computing platform 110 may retrieve, from a database and for the cluster of the plurality of clusters, a master test script. A script may comprise programming language that automates execution of tasks. Accordingly, a test script may automate an executions of tasks associated with testing a component of a webpage. The term "master test script" as used herein, generally refers to a template for a test script. The master test script may be designed to capture one or more tasks associated with testing a component. For example, a master test script for a login functionality may comprise scripts that, based on the one or more applicable rules, input a username, a password, check for correct error detection, check for display of correct error messages, and so forth. For example, master test scripts may be associated with compatibility testing, usability testing, performance testing, functionality testing, interface testing, security testing, and so forth.

Generally, a cluster may comprise components that share similar attributes, references, functionalities, and so forth. Accordingly, validation of components associated with the same cluster may involve similar scripts. Accordingly, in some embodiments, user interface validation computing platform 110 may identify a master script associated with a cluster. For example, in some embodiments, previously generated clusters may be associated with a master script, and the master script, and the association, may be stored in a repository (e.g., enterprise data storage platform 130). Accordingly, user interface validation computing platform 110 may, for a given cluster, query the repository, and retrieve a master script associated with the cluster.

For example, clusters may be based on compatibility, usability, performance, functionality, interface, and security, and user interface validation computing platform 110 may identify master test scripts associated with compatibility testing, usability testing, performance testing, functionality testing, interface testing, and security testing, respectively. For example, the master test script for performance testing may be configured to validate performance under different scenarios, such as, for example, network strengths, network loads, network capacities, network speeds, and so forth. Also, for example, the master test script for functionality testing may be configured to validate functionality under different scenarios, such as, for example, database connections, cookies, links, form submission tools, and so forth.

As another example, the master test script for compatibility testing may be configured to validate compatibility under different scenarios, such as, for example, compatibility with different types of devices (e.g., a mobile device, a smart watch, a laptop display, monitors with different resolutions, and so forth), and/or different types of browser applications, and so forth. Also, for example, the master test script for usability testing may be configured to validate usability under different scenarios, such as, for example, different user experiences, including navigation, content layout, and so forth.

As another example, the master test script for interface testing may be configured to validate interface under different scenarios, such as, for example, interactions between different app servers and web servers, and so forth. Also, for example, the master test script for security testing may be configured to validate security under different scenarios, such as, for example, various expected vulnerabilities, potential data leaks, compliance with an organization's security profile, and so forth.

Referring to FIG. 2B, at step 205, user interface validation computing platform 110 may generate, from the master script and based on the one or more attributes and the one or more rules, a test script for execution. For example, the master test script for performance testing may be configured to validate performance under different scenarios, such as, for example, network strengths, network loads, network capacities, network speeds, and so forth. Accordingly, one or more test scripts may be tailored with parameters for network strengths, network loads, network capacities, network speeds, and so forth. Such parameters may be based on the one or more attributes, and/or the one or more business rules. For example, the one or more attributes, and/or the one or more business rules may specify a computing environment, infrastructure capacities, and so forth, and a test script may be generated from the master test script by inputting the parameters for the computing environment, infrastructure capacities, and so forth. In some embodiments, user interface validation computing platform 110 may generate the test script based on one or more properties of the webpage. For example, an operating environment for the webpage may be over a Wi-Fi network, and a test script may be generated from the master test script by inputting the network parameters for the Wi-Fi network.

Also, for example, the master test script for functionality testing may be configured to validate functionality under different scenarios, such as, for example, database connections, cookies, links, form submission tools, and so forth. Accordingly, one or more test scripts may be tailored with parameters for database connections, cookies, links, form submission tools, and so forth. Such parameters may be based on the one or more attributes, and/or the one or more business rules. For example, the one or more attributes, and/or the one or more business rules may specify the database connections, cookies, and so forth, and a test script may be generated from the master test script by inputting such information. In some embodiments, user interface validation computing platform 110 may generate the test script based on one or more properties of the webpage. For example, an operating environment for the webpage may be over a cloud server, and a test script may be generated from the master test script by inputting the parameters for the cloud server.

As another example, the master test script for compatibility testing may be configured to validate compatibility under different scenarios, such as, for example, compatibility with different types of devices, and/or different types of browser applications, and so forth. Accordingly, one or more test scripts may be tailored with parameters for a specific device, and/or browsing application, and so forth. Such parameters may be based on the one or more attributes, and/or the one or more business rules. For example, the one or more attributes, and/or the one or more business rules may specify the device, the browser, and so forth, and a test script may be generated from the master test script tailored to such information. In some embodiments, user interface validation computing platform 110 may generate the test script based on one or more properties of the webpage. For example, an operating environment for the webpage may be over a wearable device, and a test script may be generated from the master test script by inputting the parameters for the wearable device.

Also, for example, the master test script for usability testing may be configured to validate usability under different scenarios, such as, for example, different user experiences, content layout, and so forth. Accordingly, one or more test scripts may be tailored with parameters for a specific user experience, content layout, and so forth. Such parameters may be based on the one or more attributes, and/or the one or more business rules. For example, the one or more attributes, and/or the one or more business rules may specify the content layout, and so forth, and a test script may be generated from the master test script tailored to such information. In some embodiments, user interface validation computing platform 110 may generate the test script based on one or more properties of the webpage. For example, the webpage may be optimized for a mobile device, and a test script may be generated from the master test script by inputting the parameters for a particular mobile device.

As another example, the master test script for interface testing may be configured to validate interface under different scenarios, such as, for example, interactions between different app servers and web servers, and so forth. Accordingly, one or more test scripts may be tailored with parameters for a specific interaction between an app server and a web server. Such parameters may be based on the one or more attributes, and/or the one or more business rules. For example, the one or more attributes, and/or the one or more business rules may specify the app server and the web server, and a test script may be generated from the master test script tailored to such information. In some embodiments, user interface validation computing platform 110 may generate the test script based on one or more properties of the webpage. For example, the webpage may be hosted by an online retailer, and a test script may be generated from the master test script based on requirements for a particular online retailer. For example, a different webpages may display filtering options for searches in different ways, and a test script may be generated from the master test script based on a particular filtering option.

Also, for example, the master test script for security testing may be configured to validate security under different scenarios, such as, for example, various expected vulnerabilities, potential data leaks, compliance with an organization's security profile, and so forth. Accordingly, one or more test scripts may be tailored with parameters for a specific vulnerability, an aspect of the security profile, and so forth. Such parameters may be based on the one or more attributes, and/or the one or more business rules. For example, the one or more attributes, and/or the one or more business rules may specify a known vulnerability, and a test script may be generated from the master test script tailored to test against this vulnerability. In some embodiments, user interface validation computing platform 110 may generate the test script based on one or more properties of the webpage. For example, the webpage may provide payment options for a retailer, and a test script may be generated from the master test script based on specific payment options offered on the webpage.

In some embodiments, at step 205, user interface validation computing platform 110 may generate, based on a functionality of the component, test data to validate the functionality. For example, the functionality may be a mortgage calculator, and user interface validation computing platform 110 may generate test data comprising an amount of a loan, a type of loan (e.g., 30-year fixed, 20-year fixed, 15-year fixed, 5/1 ARM, and so forth), an annual interest rate (e.g., 2.75% for a 10/1 ARM, 3.25% for a 30-year fixed, and so forth), and so forth. As another example, the functionality may be a login functionality, and user interface validation computing platform 110 may generate test data comprising different usernames, and/or passwords, that may be input to validate the login functionality.

At step 206, user interface validation computing platform 110 may run, for the webpage, the test script to validate the component. For example, user interface validation computing platform 110 may run the test script, load associated test data, and execute the test script. For example, user interface validation computing platform 110 may run a test script for performance testing by inputting, at run-time, the network parameters for the Wi-Fi network, and test whether the test script is successful. As another example, user interface validation computing platform 110 may run a test script for functionality testing by inputting, at run-time, the parameters for the cloud server, and test whether the test script is successful.

Also, for example, user interface validation computing platform 110 may run a test script for compatibility testing by inputting, at run-time, the parameters for the wearable device, and test whether the test script is successful. As another example, user interface validation computing platform 110 may run a test script for usability testing by inputting, at run-time, the parameters for a particular mobile device, and test whether the test script is successful. Also, for example, user interface validation computing platform 110 may run a test script for interface testing by inputting, at run-time, the parameters for a particular filtering option, and test whether the test script is successful. As another example, user interface validation computing platform 110 may run a test script for security testing by inputting, at run-time, the parameters for a known vulnerability, and test whether the test script is successful.

At step 207, user interface validation computing platform 110 may trigger, based on a determination whether the test script is successful, one or more recommendations associated with the component of the webpage. For example, the one or more recommendations may comprise a recommendation for a threshold number of attempts to execute a failed test script. For example, the threshold number may be based on a type of webpage, a type of component, a type of functionality, and so forth. For example, a component that provides a functionality with a higher value to the organization may be associated with a smaller threshold number (thereby allowing less time to validate the component), whereas a component that provides a functionality with a lower value to the organization may be associated with a higher threshold number (thereby allowing more time to validate the component). In some embodiments, for a component that provides a functionality with a higher value to the organization, after a specified number of attempts, a virtual assistant may be triggered to determine the cause of failure. In some embodiments, user interface validation computing platform 110 may trigger an alert to developers, testers, security personnel, and so forth, indicating that the component that provides a functionality with a higher value to the organization has failed to validate.

For example, the one or more recommendations may be to store a test script in the repository (e.g., enterprise data storage platform 130). In some embodiments, the test script may be associated with the component, the associated cluster, the webpage, and so forth. As another example, the one or more recommendations may be to store test data associated with the test script. As another example, one or more recommendations may be to retrieve and store data associated with execution of the script, including, for example, log files.

In some embodiments, at step 207, user interface validation computing platform 110 may determine, based on a determination that the test script has failed and based on a virtual assistant, a cause for the test script to have failed. For example, a virtual assistant, or a bot, may identify aspects of the test script that may have caused the test script to fail. Based on such information, user interface validation computing platform 110 may update the test script. For example, a missing task step may be added to the test script. Subsequently, user interface validation computing platform 110 may run, for the webpage, the updated test script to validate the component. In some embodiments, the updated test script may be run with the same test data.

In some embodiments, at step 207, user interface validation computing platform 110 may, based on a determination that the test script has failed and based on a virtual assistant, perform a second extraction of the webpage. For example, a test script to validate a login functionality on the webpage may fail. Accordingly, user interface validation computing platform 110 may extract components of the webpage that are associated with the login functionality. Then. user interface validation computing platform 110 may determine, for the component and based on the second extraction of the webpage, one or more second attributes and one or more second rules. Based on the one or more second attributes and the one or more second rules, user interface validation computing platform 110 may associate the extracted components with a second collection of clusters. Then, user interface validation computing platform 110 may compare the second collection of clusters with the clusters determined before the failed test script was generated.

Subsequently, user interface validation computing platform 110 may identify, based on a comparison of the second collection of clusters with the clusters determined before the failed test script was generated, a change to the component in the webpage. For example, a password requirement for a login functionality may have been updated after user interface validation computing platform 110 extracted the components from the webpage. Accordingly, a comparison of the second collection of clusters with the clusters determined before the failed test script was generated, would identify that the one or more rules associated with the login functionality have changed, causing the password requirement in the webpage to fail the test script. Based on detecting the change, user interface validation computing platform 110 may update the test script based on the changed password requirement, and attempt to validate the login functionality.

As another example, a security profile applicable to the webpage may have been updated after user interface validation computing platform 110 extracted the components from the webpage. Accordingly, a comparison of the second collection of clusters with the clusters determined before the failed test script was generated, would identify that the one or more rules associated with the security profile have changed, causing the associated component in the webpage to fail the test script. Based on detecting the change, user interface validation computing platform 110 may update the test script based on the changed security profile, and attempt to validate the login functionality.

In some embodiments, at step 207, user interface validation computing platform 110 may, generate, based on a determination that the test script is successful, a report indicating that the test script is successful. For example, user interface validation computing platform 110 may generate a report such as, for example, "The website is not validated," or "The login functionality has been validated," or "All links in the webpage are functional," or "No issues were detected in the functionality of the mortgage payment calculator." In some embodiments, user interface validation computing platform 110 may include additional details about the script execution, such as, for example, test data used, any run-time errors, time taken to test a component, and so forth. In some embodiments, user interface validation computing platform 110 may provide, via a graphical user interface, the generated report.

Figure 3:
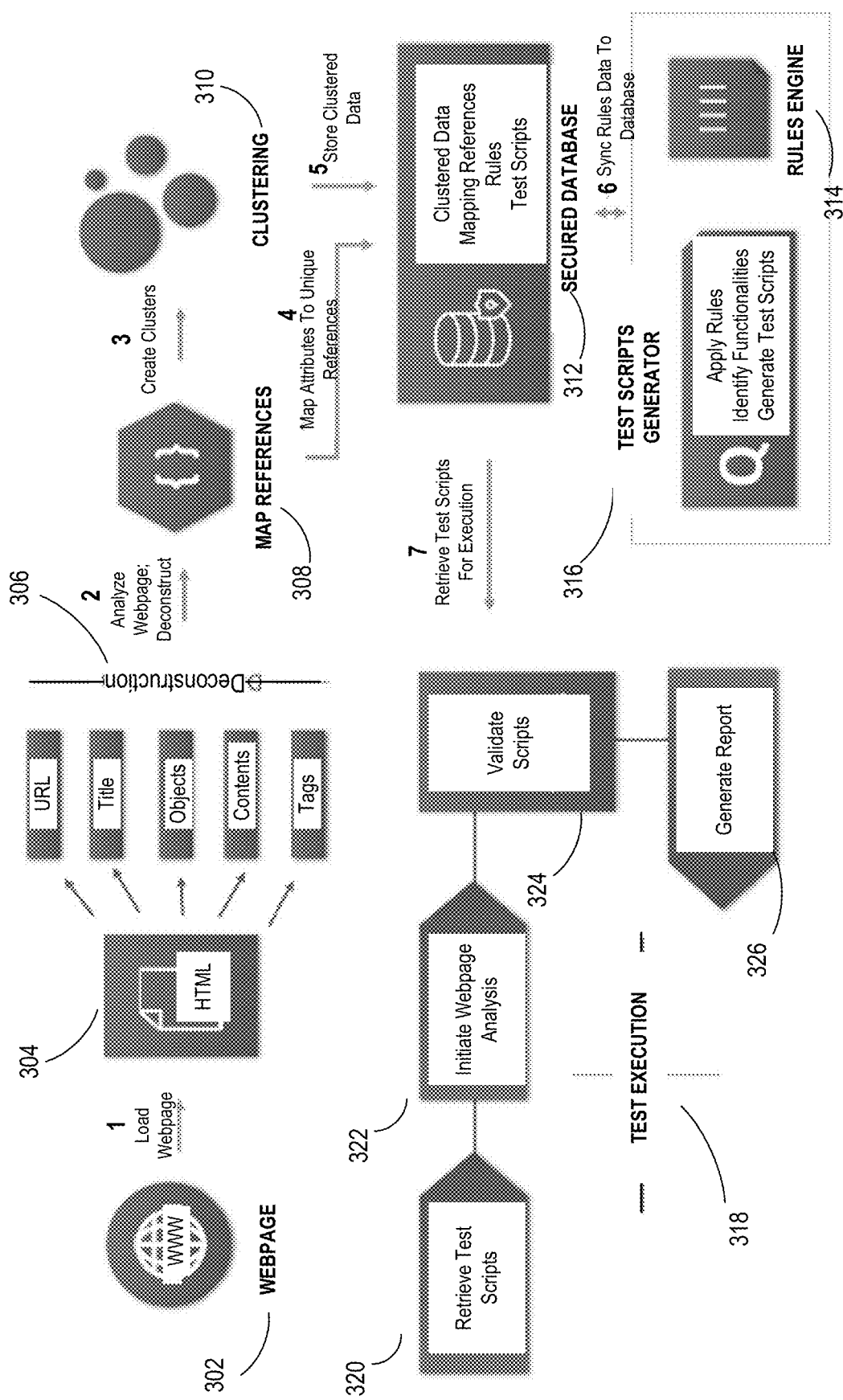
FIG. 3 depicts an illustrative block diagram for an automated and adaptive validation of a user interface.

FIG. 3 depicts an illustrative block diagram for an automated and adaptive validation of a user interface. At step 1, HTML content 304 of webpage 302 may be loaded for validation. One or more components 306 of the webpage may be extracted. For example, the one or more components 306 mat include a URL, a title, objects, content, and tags. At step 2, the webpage may be analyzed, and the one or more components 306 may be mapped to references 308. At step 3, one or more clusters may be generated based on a clustering technique 310.

At step 4, the mapped references 308, including a mapping of attributes to unique references, may be sent to a secured database 312 for storing. At step 5, an output from clustering technique 310 may be sent to secured database 312 for storing. For example, secured database 312 may include clustered data, mapping references, rules, and/or test scripts. At step 6, data from rules engine 314 may be synchronized with data in secured database 312. Based on the data from secured database 312, test script generator 316 may apply the rules, identify functionalities, and generate test scripts. In some embodiments, the test scripts may be sent to a secured database 312 for storing.

At step 7, test scripts may be retrieved from secured database 312 for test execution 318. At 320, test scripts may be retrieved. At 322, webpage analysis may be initiated. At step 324, the scripts may be validated, and at 326, a report may be generated.

Figure 4:
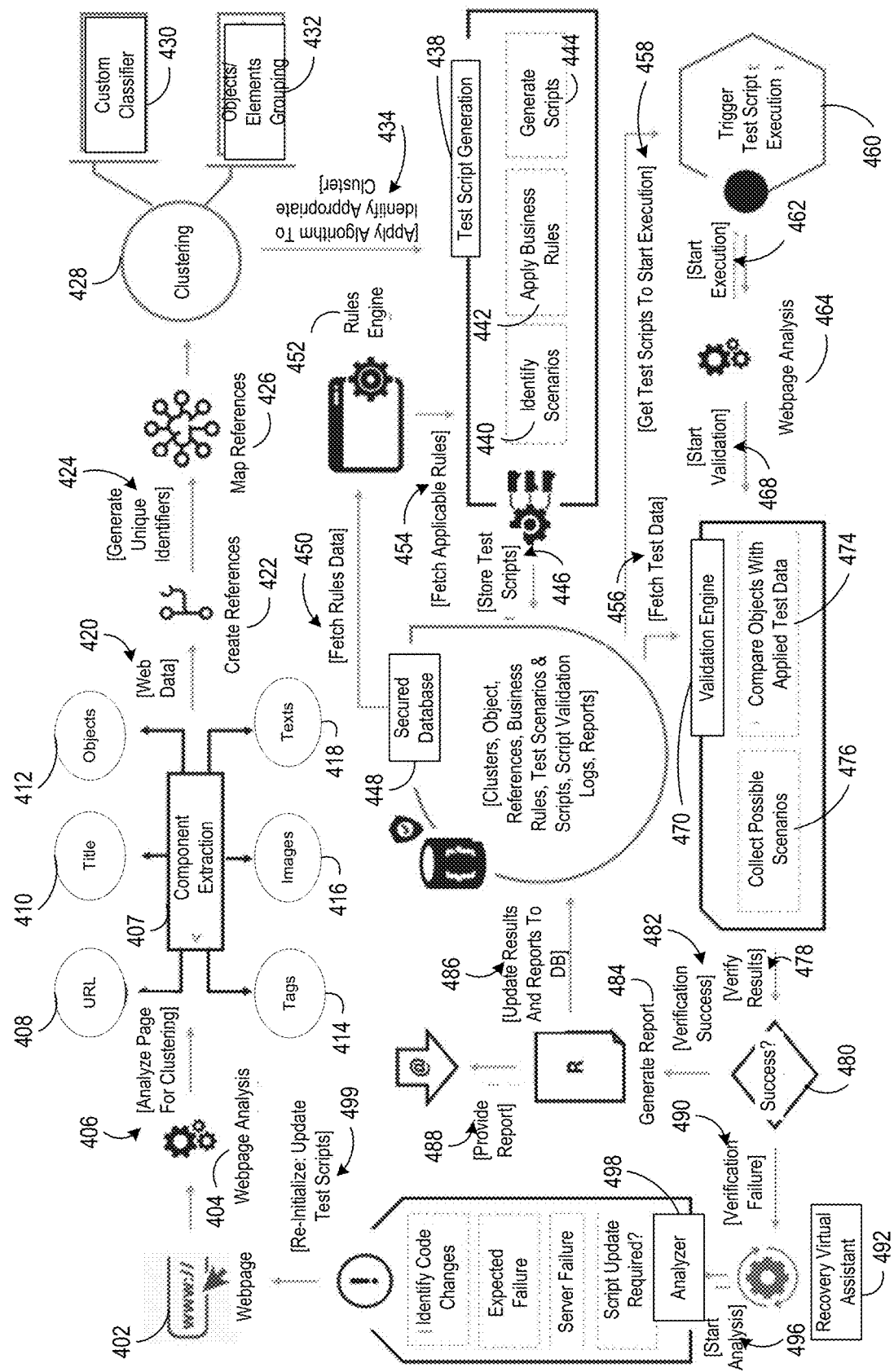
FIG. 4 depicts an illustrative architecture for an automated and adaptive validation of a user interface.

FIG. 4 depicts an illustrative architecture for an automated and adaptive validation of a user interface. A webpage analysis tool 406 may load a webpage 402. At 406, the webpage may be analyzed for clustering. Component extraction may be performed to extract components, such as URL 408, Title 410, Objects 412, Tags 414, Images 416, and Texts 418. At 420, the web data may be used to create references 422. At 424, unique identifiers may be generated for mapping to references 426. Clustering 428 may be performed. In some embodiments, a custom classifier 430 comprising business rules may be used. A grouping 432 of objects/elements may be generated. At 434, an appropriate algorithm, such as a trained machine learning model, may be applied to generate clusters.

Test Script Generation 438 may be performed. For example, scenarios 440 may be identified, business rules 442 may be applied, and scripts 444 may be generated. At 446, scripts 444 may be sent to a secured database 448 for storing. Secured database 448 may include clusters, objects, references, test scenarios, scripts, script validation logs, and/or reports. At 450, rules engine 452 may fetch rules data from secured database 448. At 454, applicable rules may be fetched from rules engine 452 for Test Script Generation 438. In some aspects, arrows 454, 446, and 450 may comprise an iterative feedback loop.

In some embodiments, at 456, validation engine 470 may fetch test data from secured database 448. Validation engine 470 may perform a collection 476 of possible scenarios, and a comparison 474 of objects with applied test data. In some embodiments, at 458, test scripts may be fetched from secured database 448 to trigger test script execution 460. At 462, execution may be started, webpage analysis 464 may be initiated, and at 468, the validation of the webpage may be initiated by validation engine 470.

At 478, results from validation engine 470 may be verified. At 480, it may be determined if the validation (e.g., execution of the test script) was successful. At 482, upon a determination that the validation was successful, a report 484 may be generated, and the report may be provided at 488. In some embodiments, at 486, the generated report may be sent to secured database 448 for storing. Also, for example, at 486, updated results, scripts, script validation logs, and so forth, may be sent to secured database 448 for storing.

At 490, upon a determination of verification failure 490, a recovery virtual assistant or bot 492 may be triggered. At 496, recovery virtual assistant or bot 492 may initiate an analysis of the failure. Analyzer 498 may identify code changes, determine expected failure, determine server failure, and/or determine if the script may need to be updated. At 499, the process may be re-initialized to generate updated test scripts, and webpage 402 may be analyzed again, thereby creating another iterative feedback loop. In some aspects, arrows 456, 462, 468, 478, 482, and 486 may comprise another iterative feedback loop. Although certain paths of a flow of a process and/or sub-process in the illustrative architecture is described herein, various other paths may be followed via the arrows to identify sub-cycles for feedback loops. Also, for example, one or more of the processes, and sub-processes may be run concurrently, and potentially in real-time.

Figure 5:
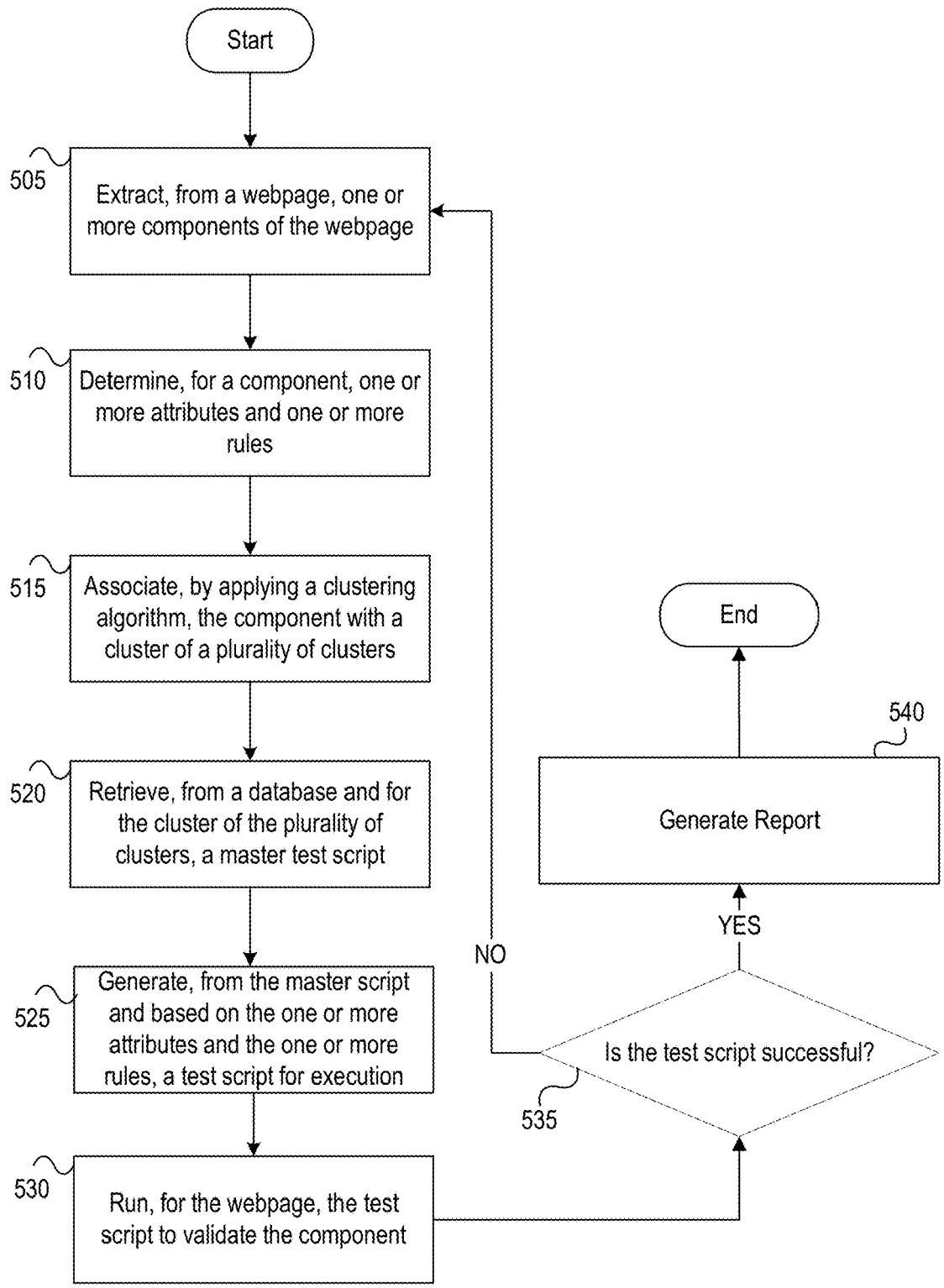
FIG. 5 depicts an illustrative architecture for an automated and adaptive validation of a user interface.

FIG. 5 depicts an illustrative method for an automated and adaptive validation of a user interface. Referring to FIG. 5, at step 505, a computing platform having at least one processor, and memory may extract, from a webpage, one or more components of the webpage. At step 510, the computing platform may determine, for a component of the one or more components, one or more attributes and one or more rules. At step 515, the computing platform may associate, by applying a clustering algorithm and based on the one or more attributes and the one or more rules, the component with a cluster of a plurality of clusters. At step 520, the computing platform may retrieve, from a database and for the cluster of the plurality of clusters, a master test script. At step 525, the computing platform may generate, from the master script and based on the one or more attributes and the one or more rules, a test script for execution. At step 530, the computing platform may run, for the webpage, the test script to validate the component.

At step 535, the computing platform may determine whether the test script is successful. Upon a determination that the test script is successful, the process may proceed to step 540. At step 540, the computing platform may generate a report. Upon a determination that the that the test script is not successful, the process may return to step 505 to determine, based on a virtual assistant, a cause for the test script to have failed.

Figure 6:
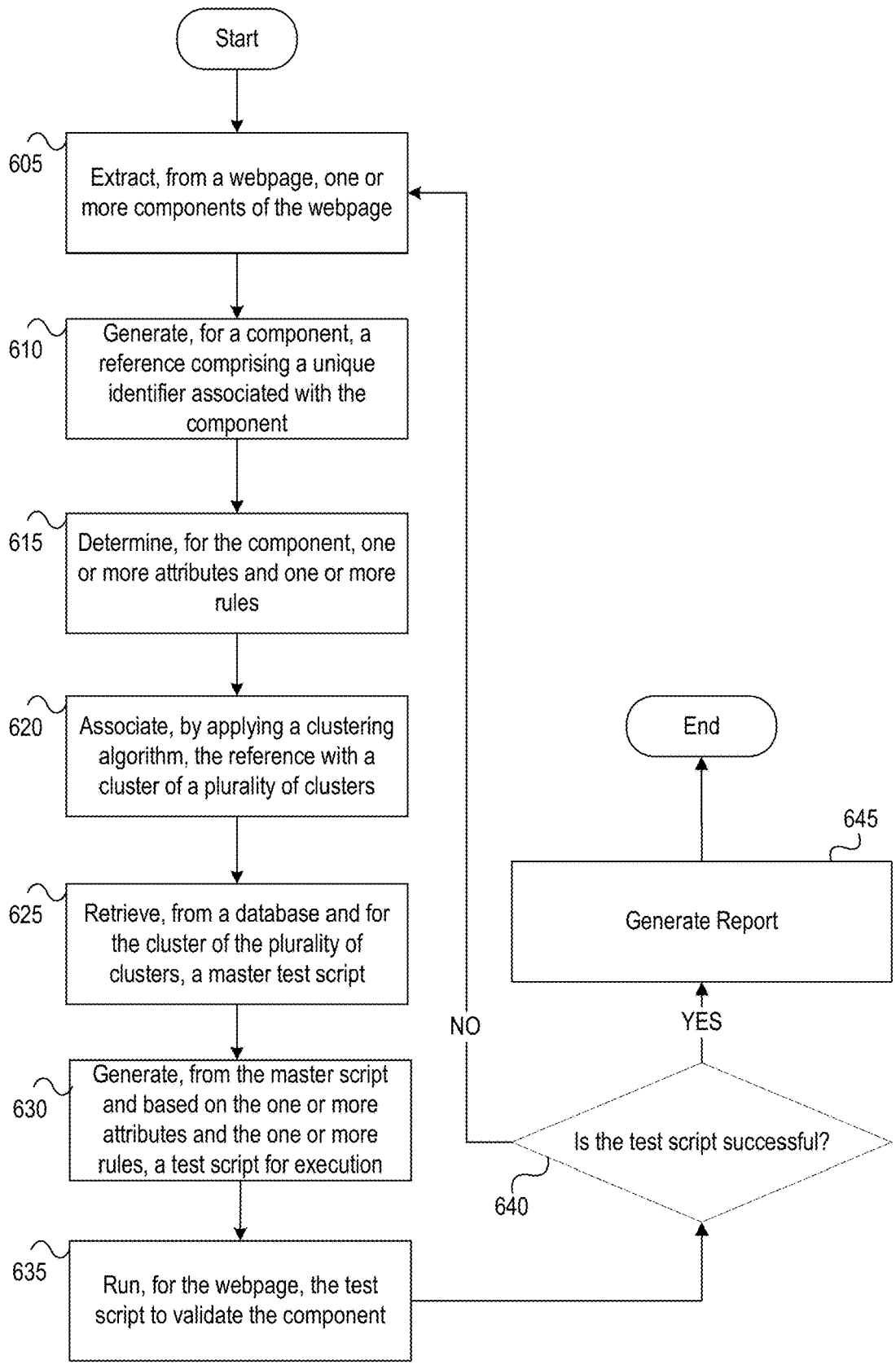
FIG. 6 depicts another illustrative method for an automated and adaptive validation of a user interface.

FIG. 6 depicts another illustrative method for an automated and adaptive validation of a user interface. Referring to FIG. 6, at step 605, a computing platform having at least one processor, and memory may extract, from a webpage, one or more components of the webpage. At step 610, the computing platform may generate, from the webpage and for a component of the one or more components, a reference comprising a unique identifier associated with the component. At step 615, the computing platform may determine, for a component of the one or more components, one or more attributes and one or more rules. At step 620, the computing platform may associate, by applying a clustering algorithm and based on the one or more attributes and the one or more rules, the reference with a cluster of a plurality of clusters. At step 625, the computing platform may retrieve, from a database and for the cluster of the plurality of clusters, a master test script. At step 630, the computing platform may generate, from the master script and based on the one or more attributes and the one or more rules, a test script for execution. At step 635, the computing platform may run, for the webpage, the test script to validate the component.

At step 640, the computing platform may determine whether the test script is successful. Upon a determination that the test script is successful, the process may proceed to step 645. At step 645, the computing platform may generate a report. Upon a determination that the that the test script is not successful, the process may return to step 605 to determine, based on a virtual assistant, a cause for the test script to have failed.

Figure 7:
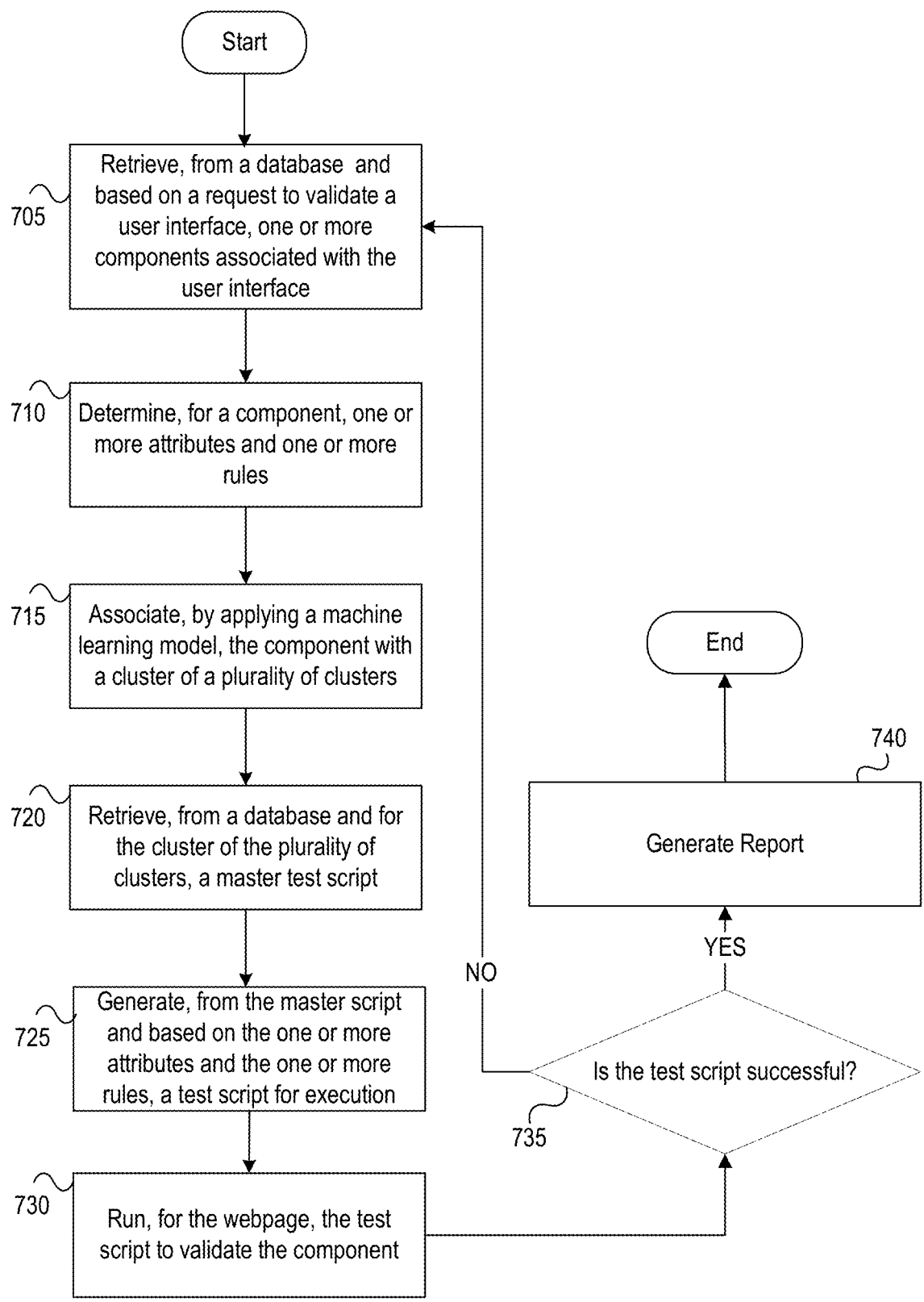
FIG. 7 depicts another illustrative method for an automated and adaptive validation of a user interface.

FIG. 7 depicts another illustrative method for an automated and adaptive validation of a user interface. Referring to FIG. 7, at step 705, a computing platform having at least one processor, and memory may retrieve, from a database and based on a request to validate a user interface, one or more components associated with the user interface. At step 510, the computing platform may determine, for a component of the one or more components, one or more attributes and one or more rules. At step 715, the computing platform may associate, by applying a machine learning model and based on the one or more attributes and the one or more rules, the component with a cluster of a plurality of clusters. At step 720, the computing platform may retrieve, from a database and for the cluster of the plurality of clusters, a master test script. At step 725, the computing platform may generate, from the master script and based on the one or more attributes and the one or more rules, a test script for execution. At step 730, the computing platform may run, for the webpage, the test script to validate the component.

At step 735, the computing platform may determine whether the test script is successful. Upon a determination that the test script is successful, the process may proceed to step 740. At step 740, the computing platform may generate a report. Upon a determination that the that the test script is not successful, the process may return to step 705 to determine, based on a determination that the test script has failed and based on a virtual assistant, a cause for the test script to have failed.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising: at least one processor; and
memory storing computer-readable instructions that, when executed by the at least one processor, cause the computing platform to:
extract, from a webpage, one or more components of the webpage;
determine, for a component of the one or more components, one or more attributes and one or more rules;
determine, for the component of the one or more components, a reference comprising a unique identifier associated with the component;
associate, by applying a clustering algorithm and based on the reference, the one or more attributes and the one or more rules, the component with a cluster of a plurality of clusters;
retrieve, from a database and for the cluster of the plurality of clusters, a master test script;
generate, from the master test script and based on the one or more attributes and the one or more rules, a test script for execution;
run, for the webpage, the test script to validate the component; and
trigger, based on a determination whether the test script is successful, one or more recommendations associated with the component of the webpage, wherein the one or more recommendations associated with the component of the webpage include a recommendation for a threshold number of attempts to execute a failed test script and wherein the threshold is based on a type of component of the component of the one or more components.

2. The computing platform of claim 1, wherein the instructions to trigger the one or more recommendations comprise additional computer-readable instructions that, when executed by the at least one processor, cause the computing platform to:
determine that the test script has failed at least the threshold number of attempts;
responsive to determining that the test script has failed at least the threshold number of attempts, trigger a virtual assistant to determine a cause of the failure;
determine, based on the virtual assistant, the cause for the failure;
update, based on the cause, the test script; and
run, for the webpage, the updated test script to validate the component.

3. The computing platform of claim 2, wherein the instructions comprise additional computer-readable instructions that, when executed by the at least one processor, cause the computing platform to:
perform a second extraction of the webpage;
determine, for the component and based on the second extraction, one or more second attributes and one or more second rules; and
identify, based on a comparison of the one or more second attributes with the one or more attributes, and of the one or more second rules with the one or more rules, a change to the component, and
wherein the updating the test script is based on the identified change.

4. The computing platform of claim 1, wherein the instructions comprise additional computer-readable instructions that, when executed by the at least one processor, cause the computing platform to:
provide, via a graphical user interface, a report.

5. The computing platform of claim 1, wherein the reference is generated from the webpage.

6. The computing platform of claim 1, wherein the instructions comprise additional computer-readable instructions that, when executed by the at least one processor, cause the computing platform to:
train a machine learning model to determine the plurality of clusters.

7. The computing platform of claim 1, wherein the instructions to generate the test script comprise additional computer-readable instructions that, when executed by the at least one processor, cause the computing platform to:

generate, based on a functionality of the component, test data to validate the functionality.

8. The computing platform of claim 1, wherein the instructions to generate the test script comprise additional computer-readable instructions that, when executed by the at least one processor, cause the computing platform to:
generate the test script based on one or more properties of the webpage.

9. The computing platform of claim 1, wherein the component comprises one of: an object of the webpage, a property of the webpage, a name associated with the webpage, an action performed by the webpage, a tag associated with the webpage, a title of the webpage, a uniform resource locator for the webpage, and content of the webpage.

10. A method, comprising:
at a computing platform comprising at least one processor, and memory:
extracting, from a webpage, one or more components of the webpage;
generating, from the webpage and for a component of the one or more components, a reference comprising a unique identifier associated with the component;
determining, for the component, one or more attributes and one or more rules;
associating, by applying a clustering algorithm and based on the reference, the one or more attributes and the one or more rules, the component with a cluster of a plurality of clusters;
retrieving, from a database and for the cluster of the plurality of clusters, a master test script;
generating, from the master test script and based on the one or more attributes and the one or more rules, a test script for execution;
running, for the webpage, the test script to validate the component; and
triggering, based on a determination whether the test script is successful, one or more recommendations associated with the component of the webpage, wherein the one or more recommendations associated with the component of the webpage include a recommendation for a threshold number of attempts to execute a failed test script and wherein the threshold is based on a type of component of the component of the one or more components.

11. The method of claim 10, wherein the triggering the one or more recommendations further comprising:
determining that the test script has failed at least the threshold number of attempts;
responsive to determining that the test script has failed at least the threshold number of attempts, triggering a virtual assistant to determine a cause of the failure;
determining, based on the virtual assistant, a cause for the failure;
updating, based on the cause, the test script; and
running, for the webpage, the updated test script to validate the component.

12. The method of claim 11, further comprising:
performing a second extraction of the webpage;
determining, for the component and based on the second extraction, one or more second attributes and one or more second rules; and
identifying, based on a comparison of the one or more second attributes with the one or more attributes, and of the one or more second rules with the one or more rules, a change to the component, and
wherein the updating the test script is based on the identified change.

13. The method of claim 10, further comprising:
providing, via a graphical user interface, a report.

14. The method of claim 10, further comprising:
training a machine learning model to determine the plurality of clusters.

15. The method of claim 10, wherein the generating the test script further comprising:
generating, based on a functionality of the component, test data to validate the functionality.

16. The method of claim 10, wherein the generating the test script further comprising:
generating the test script based on one or more properties of the webpage.

17. The method of claim 10, wherein the component comprises one of: an object of the webpage, a property of the webpage, a name associated with the webpage, an action performed by the webpage, a tag associated with the webpage, a title of the webpage, a uniform resource locator for the webpage, and content of the webpage.

18. One or more non-transitory computer-readable media storing instructions that, when executed by a computing platform comprising at least one processor, at least one physical sensor communicatively coupled to the at least one processor, and memory, cause the computing platform to:
retrieve, from a database and based on a request to validate a user interface, one or more components associated with the user interface;
determine, for a component of the one or more components, one or more attributes and one or more rules;
determine, for the component of the one or more components, a reference comprising a unique identifier associated with the component;
associate, by applying a machine learning model and based on the reference, the one or more attributes and the one or more rules, the component with a cluster of a plurality of clusters;
retrieve, from the database and for the cluster of the plurality of clusters, a master test script;
generate, from the master test script and based on the one or more attributes and the one or more rules, a test script for execution;
run, for the user interface, the test script to validate the component; and
trigger, based on a determination whether the test script is successful, one or more recommendations associated with the component of the user interface, wherein the one or more recommendations associated with the component of the user interface include a recommendation for a threshold number of attempts to execute a failed test script and wherein the threshold is based on a type of component of the component of the one or more components.

* * * * *